US012612492B2

(12) United States Patent
Khodaparast et al.

(10) Patent No.: US 12,612,492 B2

(45) Date of Patent: Apr. 28, 2026

(54) SILICONE POLYOXAMIDE COPOLYMERS WITH AMINE-BASED END GROUPS

(71) Applicant: 3M INNOVATIVE PROPERTIES COMPANY, St. Paul, MN (US)

(72) Inventors: Payam Khodaparast, Minneapolis, MN (US); Lindsey R. Kryger, Hudson, WI (US); Christina D. Cowman-Eggert, Inver Grove Heights, MN (US); David S. Hays, Woodbury, MN (US); Margaret M. Sheridan, Woodbury, MN (US); Karl E. Benson, St. Paul, MN (US); Daniel Carvajal, Edina, MN (US); Krystal K. Hunt, Afton, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 950 days.

(21) Appl. No.: 17/784,153

(22) PCT Filed: Dec. 15, 2020

(86) PCT No.: PCT/IB2020/061979

§ 371 (c)(1),
(2) Date: Jun. 10, 2022

(87) PCT Pub. No.: WO2021/124113

PCT Pub. Date: Jun. 24, 2021

(65) Prior Publication Data

US 2023/0054849 A1 Feb. 23, 2023

Related U.S. Application Data

(60) Provisional application No. 62/950,806, filed on Dec. 19, 2019, provisional application No. 62/950,788, filed on Dec. 19, 2019.

(51) Int. Cl.

| | |
|---|---|
| ***C08G 77/26*** | (2006.01) |
| ***C08G 77/08*** | (2006.01) |
| ***C08G 77/54*** | (2006.01) |
| ***C08L 83/08*** | (2006.01) |
| ***C09J 11/04*** | (2006.01) |
| ***C09J 183/14*** | (2006.01) |

(52) U.S. Cl.

CPC ............ *C08G 77/26* (2013.01); *C08G 77/08* (2013.01); *C08G 77/54* (2013.01); *C08L 83/08* (2013.01); *C09J 183/14* (2013.01); *C08G 2170/40* (2013.01); *C09J 11/04* (2013.01)

(58) Field of Classification Search

CPC .... C08G 2170/40; C08G 77/08; C08G 77/26; C08G 77/38; C08G 77/388; C08G 77/445; C08G 77/452; C08G 77/455; C08G 77/54; C08K 5/10; C08K 5/17; C08L 83/08; C08L 83/10; C09J 11/04; C09J 183/10; C09J 183/14

See application file for complete search history.

(56) References Cited

U.S. PATENT DOCUMENTS

| | | | |
|---|---|---|---|
| 2,676,182 | A | 4/1954 | Herbert et al. |
| 2,736,721 | A | 2/1956 | Dexter et al. |
| 3,627,851 | A | 12/1971 | Brady |
| 3,772,247 | A | 11/1973 | Flannigan et al. |
| 3,890,269 | A | 6/1975 | Martin |
| 4,661,577 | A | 4/1987 | Jo et al. |
| 4,935,484 | A | 6/1990 | Wolfgruber |

(Continued)

FOREIGN PATENT DOCUMENTS

| | | | |
|---|---|---|---|
| JP | 02036234 | A | 2/1990 |
| JP | 6067254 | B2 | 6/2012 |
| WO | 2011034839 | | 3/2011 |
| WO | 2017136188 | | 8/2017 |
| WO | 2019043491 | | 3/2019 |
| WO | 2021124113 | A1 | 6/2021 |

OTHER PUBLICATIONS

Encyclopedia of Polymer Science and Engineering, vol. 15, John Wiley & Sons, New York, (1989), pp. 265-270.

(Continued)

*Primary Examiner* — Ana L. Woodward

(57) ABSTRACT

Silicone polyoxamide and silicone polyoxamide-hydrazide copolymers comprise at least two repeating units of formula (I). In this formula, each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN—G—HR^3$ minus the two $—NHR^3$ groups; each $R^3$ is independently hydrogen or alkyl or $R^3$ taken together with G and with the nitrogen to which they are both attached form a heterocyclic group; each n is independently an integer of 0 to 300; each p is independently an integer of 1 to 25, and the average of p is 1.3 or greater; and each q is independently an integer of 1 to 2, and the average of q is no greater than 1.05.

(I)

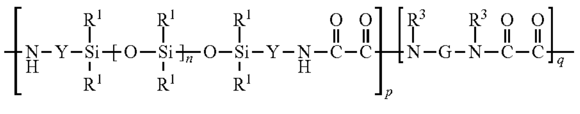

22 Claims, No Drawings

(56) References Cited

U.S. PATENT DOCUMENTS

| | | | |
|---|---|---|---|
| 5,026,890 A | 6/1991 | Webb et al. | |
| 5,082,706 A | 1/1992 | Tangney | |
| 5,110,890 A | 5/1992 | Butler | |
| 5,214,119 A | 5/1993 | Leir et al. | |
| 5,248,739 A | 9/1993 | Schmidt et al. | |
| 5,276,122 A | 1/1994 | Aoki et al. | |
| 5,302,685 A | 4/1994 | Tsumura et al. | |
| 5,319,040 A | 6/1994 | Wengrovius et al. | |
| 5,461,134 A | 10/1995 | Leir et al. | |
| 5,512,650 A | 4/1996 | Leir et al. | |
| 6,355,759 B1 | 3/2002 | Sherman et al. | |
| 6,403,206 B1 | 6/2002 | Bries et al. | |
| 6,531,620 B2 | 3/2003 | Brader et al. | |
| 6,569,521 B1 | 5/2003 | Sheridan et al. | |
| 6,572,945 B2 | 6/2003 | Bries et al. | |
| 6,730,397 B2 | 5/2004 | Melancon et al. | |
| 6,972,141 B1 | 12/2005 | Bries et al. | |
| 7,078,093 B2 | 7/2006 | Sheridan et al. | |
| 7,371,464 B2 | 5/2008 | Sherman et al. | |
| 7,501,184 B2 * | 3/2009 | Leir ....................... | C08G 69/00<br>428/447 |
| 7,705,101 B2 | 4/2010 | Sherman et al. | |
| 7,705,103 B2 | 4/2010 | Sherman et al. | |
| 7,781,056 B2 | 8/2010 | Bries et al. | |
| 7,820,297 B2 | 10/2010 | Benson et al. | |
| 7,981,985 B2 | 7/2011 | Fuji et al. | |
| 7,981,995 B2 | 7/2011 | Hays et al. | |
| 8,063,166 B2 | 11/2011 | Sherman et al. | |
| 8,124,713 B2 | 2/2012 | Hays et al. | |
| 8,653,216 B2 | 2/2014 | Sherman et al. | |
| 8,691,391 B2 | 4/2014 | Sherman et al. | |
| 8,764,881 B2 | 7/2014 | Sandru et al. | |
| 8,765,881 B2 | 7/2014 | Hays et al. | |
| 9,434,821 B2 | 9/2016 | Leir et al. | |
| 9,527,965 B2 | 12/2016 | Sherman et al. | |
| 9,896,575 B2 | 2/2018 | Duchesne et al. | |
| 10,155,834 B2 | 12/2018 | Humpal et al. | |
| 11,492,491 B2 | 11/2022 | Sherman et al. | |
| 2011/0071268 A1 | 3/2011 | Hays et al. | |
| 2016/0068722 A1 | 3/2016 | Schmitz-Stapela et al. | |
| 2019/0006260 A1 | 1/2019 | Pavier et al. | |
| 2019/0048152 A1 | 2/2019 | Humpal et al. | |

OTHER PUBLICATIONS

International Search Report for PCT Application No. PCT/IB2020/061979, mailed on May 20, 2021, 3 pages.

International Search Report for PCT Application No. PCT/IB2020/062114, mailed on May 18, 2021, 3 pages.

* cited by examiner

SILICONE POLYOXAMIDE COPOLYMERS WITH AMINE-BASED END GROUPS

RELATED CASE

This application is a national stage filing under 35 U.S.C. 371 of PCT/IB2020/061979, filed 15 Dec. 2020, which claims the benefit of U.S. Provisional Application No. 62/950,788, filed Dec. 19, 2019, and U.S. Provisional Application No. 62/950,806, filed Dec. 19, 2019, the contents of which are incorporated in their entireties herein.

SUMMARY

Siloxane polymers have unique properties derived mainly from the physical and chemical characteristics of the siloxane bond. These properties include low glass transition temperature, thermal and oxidative stability, resistance to ultraviolet radiation, low surface energy and hydrophobicity, high permeability to many gases, and biocompatibility. The siloxane polymers, however, often lack tensile strength.

The low tensile strength of the siloxane polymers can be improved by forming block copolymers. Some block copolymers contain a "soft" siloxane polymeric block or segment and any of a variety of "hard" blocks or segments. Polydiorganosiloxane polyamides, polydiorganosiloxane polyureas, and polydiorganosiloxane polyoxamide copolymers are exemplary block copolymers.

Polydiorganosiloxane polyamides have been prepared by condensation reactions of amino terminated silicones with short-chained dicarboxylic acids. Alternatively, these copolymers have been prepared by condensation reactions of carboxy terminated silicones with short-chained diamines. Because polydiorganosiloxanes (e.g., polydimethylsiloxanes) and polyamides often have significantly different solubility parameters, it can be difficult to find reaction conditions for production of siloxane-based polyamides that result in high degrees of polymerization, particularly with larger homologs of the polyorganosiloxane segments. Many of the known siloxane-based polyamide copolymers contain relatively short segments of the polydiorganosiloxane (e.g., polydimethylsiloxane) such as segments having no greater than 30 diorganosiloxy (e.g., dimethylsiloxy) units or the amount of the polydiorganosiloxane segment in the copolymer is relatively low. That is, the fraction (i.e., amount based on weight) of polydiorganosiloxane (e.g., polydimethylsiloxane) soft segments in the resulting copolymers tends to be low.

Polydiorganosiloxane polyoxamides such as those disclosed in U.S. Pat. No. 7,501,184 (Leir et al.) are yet another type of block copolymer. Known polydiorganosiloxane polyoxamide copolymers have been made by mixing a diamine such as ethylene diamine with a precursor that includes at least one polydiorganosiloxane segment and at least two oxalylamino groups. The resulting copolymers have alternating soft polydiorganosiloxane segments (S) and hard oxamide segments (H) (i.e., the copolymers are of a $(S—H)_n$ type). These polydiorganosiloxane polyoxamide copolymers thus contain a relatively large fraction of the polydiorganosiloxane segment compared to many known polydiorganosiloxane polyamide copolymers. Such polydiorganosiloxane polyoxamide copolymers can usually be subjected to elevated temperatures up to 250° C. or higher without apparent degradation.

Additional polydiorganosiloxane polyoxamide copolymers are described in U.S. Pat. Nos. 7,981,995 and 8,124,713 (Hays et al.). Such polydiorganosiloxane polyoxamides copolymers feature a more random distribution of hard segments (H) between soft segments (S), with the extra "runs" of hard segments providing improved properties in the described applications.

In view of the foregoing, the present inventors recognize that although the alternating soft and hard segment polydiorganosiloxane polyoxamide copolymers described above are an improvement over less thermally stable thermoplastic silicone elastomers, it would be advantageous to have the ability to firmly control the distribution of hard segments within the copolymer chain, while expediting or excising process steps thought necessary to create such copolymers. Furthermore, the performance of the resulting copolymers in certain adhesive compositions could be enhanced by "capping" an intermediate structure with amine-based end groups, allowing for additional application tailoring and adhesive performance improvement. Adhesive compositions featuring the capped copolymers demonstrate at least one of improved peel adhesion in humid conditions, improved shear strength in humid conditions, and reduced adhesion to certain fluorosilicone release materials.

Briefly, in one aspect, the present disclosure provides silicone polyoxamide and silicone polyoxamide-hydrazide copolymers comprising at least two repeating units of formula I:

(I)

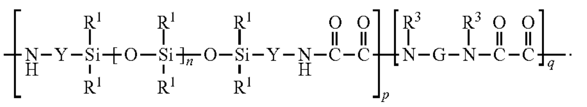

In this formula, each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN—G—NHR^3$ minus the two $—NHR^3$ groups; each $R^3$ is independently hydrogen or alkyl or $R^3$ taken together with G and with the nitrogen to which they are both attached form a heterocyclic group; each n is independently an integer of 0 to 300; each p is independently an integer of 1 to 25, and the average of p is 1.3 or greater; and each q is independently an integer of 1 to 2, and the average of q is 1.05 or less.

The silicone polyoxamide and silicone polyoxamide-hydrazide copolymers have both hard segments and soft segments. The soft segments are contributed by the silicone-based amines that have a polydiorganosiloxane segment p. The hard segments are contributed by the oxamide group containing segment q.

In another aspect, the present disclosure provides a method of making a copolymeric material comprising at least two repeat units of formula I':

(I')

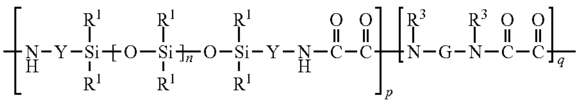

wherein $R^1$, Y, G, $R^3$, n, p, and q are defined as above.

The method comprises (a) adding an oxalate ester of formula II to a solvent (II)

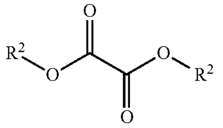

wherein each $R^2$ is independently an alkyl, haloalkyl, aryl, or aryl substituted with an alkyl, alkoxy, halo, alkyoxycarbonyl, or

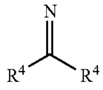

bound through the N, wherein each $R^4$ is independently hydrogen, alkyl, or aryl or $R^4$ taken together form a ring; (b) reacting a polydiorganosiloxane diamine of formula III until essentially no oxalate ester remains (III)

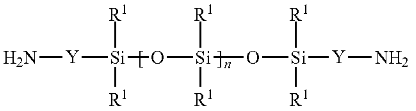

to form the reaction product of formula IV (IV)

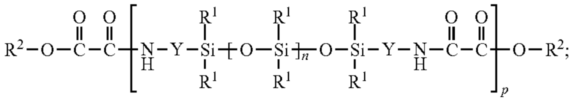

(c) adding one or more diamines of formula V to the reaction product of formula IV to form the repeat unit of formula I'

(V)

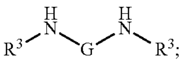

and (d) adding one or more capping agents of formula VI in an amount sufficient to halt polymerization

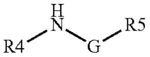

Previously known methods of making polydiorganosiloxane polyoxamide copolymers such as the methods disclosed in U.S. Pat. No. 7,501,184 (Leir et al.), U.S. Pat. Nos. 8,764,881, 7,981,985, and 8,124,713 (Hays et al.) can require a costly excess of oxalate, demand recrystallization at certain steps, or can result in undesirable rheological characteristics for mounting and other adhesive applications. The methods of the present disclosure, however, can be used to make copolymers particularly well suited for use in pressure sensitive adhesives and mounting articles, with fewer steps and raw material amounts needed to create the copolymers.

The present disclosure further provides adhesive compositions including the silicone copolymers described above. Adhesive compositions of the present disclosure can include a silicone polyoxamide copolymer or silicone polyoxamide-hydrazide copolymer, a tackifying resin, and optionally filler. The adhesive compositions can be at least one of pressure sensitive and heat-activated, as those terms are defined below. In some embodiments, the adhesive composition includes at least one of a silicone polyoxamide or silicone polyoxamide-hydrazide copolymer, a silicate tackifying resin, and optionally inorganic particle filler. The adhesive compositions may be stretch release or peel release and may be damage-free.

DETAILED DESCRIPTION

The silicone polyoxamide and silicone polyoxamide-hydrazide copolymers of the disclosure comprise at least two repeating units of formula I:

(I)

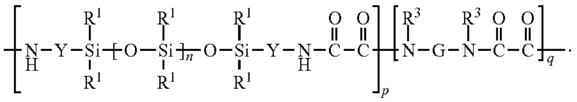

In this formula, each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN—G—NHR^3$ minus the two $—NHR^3$ groups; each $R^3$ is independently hydrogen or alkyl or $R^3$ taken together with G and with the nitrogen to which they are both attached form a heterocyclic group (e.g., $R^3HN—G—NHR^3$ is piperazine or the like); each n is independently an integer of 0 to 300; each p is independently an integer of 1 to 25, and the average of p is 1.3 or greater; and each q is independently an integer of 1 to 2, and the average of q is 1.05 or less.

Suitable alkyl groups for $R^1$ in formula I typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some embodiments, in some repeat units of formula I, at least 40 percent, and preferably at least 50 percent, of the $R^1$ groups are methyl. For example, at least 60 percent, at least 70 percent, at least 80 percent, at least 90 percent, at least 95 percent, at least 98 percent, or at least 99 percent of the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

Each Y in formula I is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein with reference to group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each G in formula I is independently a bond or a residual unit that is equal to a diamine compound of formula $R^3HN—G—NHR^3$ minus the two amino groups (i.e., $—NHR^3$ groups). When G is a bond, the copolymer is a silicone polyoxamide-hydrazide. In some embodiments, G is a bond and each $R^3$ is hydrogen.

When G is a residual unit, the copolymer is a silicone polyoxamide. The diamine can have primary or secondary amino groups. Group $R^3$ is hydrogen or alkyl (e.g., an alkyl having 1 to 10, 1 to 6, or 1 to 4 carbon atoms) or $R^3$ taken together with G and with the nitrogen to which they are both attached forms a heterocyclic group (e.g., $R^3HN—G—NHR^3$ is piperazine). In most embodiments, $R^3$ is hydrogen or an alkyl. In many embodiments, both of the amino groups of the diamine are primary amino groups (i.e., both $R^3$ groups are hydrogen) and the diamine is of formula $H_2N—G—NH_2$.

In some embodiments, G is an alkylene, heteroalkylene, arylene, aralkylene, or a combination thereof. Suitable alkylenes often have 2 to 10, 2 to 6, or 2 to 4 carbon atoms. Exemplary alkylene groups include ethylene, propylene, butylene, and the like. Suitable heteroalkylenes are often polyoxyalkylenes such as polyoxyethylene having at least 2 ethylene units, polyoxypropylene having at least 2 propylene units, or copolymers thereof. Suitable aralkylene groups usually contain an arylene group having 6 to 12 carbon atoms bonded to an alkylene group having 1 to 10 carbon atoms. Some exemplary aralkylene groups are phenylene-alkylene where the phenylene is bonded to an alkylene having 1 to 10 carbon atoms, 1 to 8 carbon atoms, 1 to 6 carbon atoms, or 1 to 4 carbon atoms. As used herein with reference to group G, "a combination thereof" refers to a combination of two or more groups selected from an alkylene, heteroalkylene, arylene, and aralkylene. A combination can be, for example, an aralkylene bonded to an alkylene (e.g., alkylene-arylene-alkylene). In one exemplary alkylene-arylene-alkylene combination, the arylene is phenylene and each alkylene has 1 to 10, 1 to 6, or 1 to 4 carbon atoms.

Each subscript n in formula I is independently an integer of 0 to 300. For example, subscript n can be an integer up to 275, up to 250, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 300, 1 to 300, 1 to 200, 1 to 100, 1 to 80, 1 to 40, or 1 to 20.

Each subscript p is independently an integer of 1 to 25. For example, the value of p is often an integer up to 9, up to 8, up to 7, up to 6, up to 5, up to 4, up to 3, or up to 2. The value of p can be in the range of 1 to 8, 1 to 6, or 1 to 4. The average of p is 1.3 or greater.

The soft segments (p) tend to be present in the copolymer of Formula I at a multi-modal distribution of number average molecular weights.

Each subscript q is independently an integer of 1 to 2, and substantially every q is 1. In some embodiments, each subscript q is an integer of 1. The average of q is 1.05 or less. Without wishing to be bound by theory, an average q of 1.05 or less limits the number of crosslinks in the hard segment, maintaining the copolymers of the present disclosure below the gel point. The use of such copolymers in adhesive compositions can result in at least one of enhanced shear strength and improved peel adhesion to target adherends.

Failing to keep q at an average of 1.05 or less can result in too many runs (i.e., where q is 2 or more) of hard segments, leading to overly stiff and less desirable adhesive compositions for certain applications. Such compositions may be insufficiently tacky and/or may not sufficiently wet out on surfaces. An adhesive composition featuring an average of q greater than 1.05 might be particularly undesirable for mounting applications described in more depth below.

The value of q and p can be controlled by the ratio of components used to prepare the precursor of formula IV below in the creation of the copolymers of formula I'. A sufficient molar amount of amino groups in the polydiorganosiloxane diamine of formula III of (e.g., the amount needed to achieve a molar ratio with the oxalate ester compound of formula II of at least 0.56:1) tends to favor the formation of precursors of formula IV that, when forwarded to copolymers of formula I', result in the substantial majority of the compounds having q equal to 1 (i.e., such that the average of q is 1.05 or less). Moreover, a molar ratio (i.e., stoichiometric ratio) of silicone amine to oxalate ester of at least 0.56:1 can help ensure that p is greater than or equal to 1.3.

The molar ratio of total amine to oxalate ester in the copolymers of formula I is typically about 0.96:1.04. For embodiments that are capped with amine-based end groups of formula VI, described in further detail below, the molar ratio of total mine to oxalate ester is typically about 1.07:1. Increasing the total amine above 1.04 tends to halt polymerization and ensure in the addition of the desired end group architecture.) All or nearly all of the carbonylamino groups along the backbone of the copolymeric material are part of an oxalylamino group (i.e., the —(CO)—(CO)—NH— group). That is, any carbonyl group along the backbone of the copolymeric material is bonded to another carbonyl group and is part of an oxalyl group. More specifically, the copolymers of the disclosure have a plurality of aminoxalylamino groups.

The silicone polyoxamide and silicone polyoxamide-hydrazide copolymers of the disclosure (and other silicone polyoxamide and silicone polyoxamide-hydrazide copolymers) can be prepared according the method of the disclosure. The following method can be used to make a copolymeric material comprising at least two repeat units of formula I':

(I')

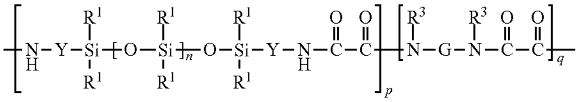

wherein each $R^1$ is independently an alkyl, haloalkyl, aralkyl, alkenyl, aryl, or aryl substituted with an alkyl, alkoxy, or halo; each Y is independently an alkylene, aralkylene, or a combination thereof; each G is independently a bond or a divalent residue equal to a diamine of formula $R^3HN—G—NHR^3$ minus the two $—NHR^3$ groups; each $R^3$ is independently hydrogen or alkyl or $R^3$ taken together with G and with the nitrogen to which they are both attached form a heterocyclic group; each n is independently an integer of 0 to 300; each p is independently an integer of 1 to 25 and the average of p is 1.3 or greater; and each q is independently an integer of 1 to 2, with an average of q is 1.05 or less.

Suitable examples of $R^1$, Y, G, and $R^3$ are the same as described above for formula I.

The first step of the method of the disclosure comprises adding an oxalate ester of formula II to a solvent (II)

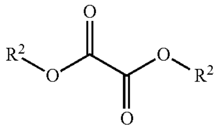

wherein each $R^2$ is independently an alkyl, haloalkyl, aryl, or aryl substituted with an alkyl, alkoxy, halo, alkyoxycarbonyl, or

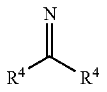

bound through the N, wherein each $R^4$ is independently hydrogen, alkyl, or aryl or $R^4$ taken together form a ring.

The two $R^2$ groups in the oxalate of formula II can be the same or different. In some methods, the two $R^2$ groups are different and have different reactivity with the polydiorganosiloxane diamine of formula III below.

Suitable alkyl and haloalkyl groups for $R^2$ often have 1 to 10, 1 to 6, or 1 to 4 carbon atoms. Although tertiary alkyl (e.g., tert-butyl) and haloalkyl groups can be used, there is often a primary or secondary carbon atom attached directly (i.e., bonded) to the adjacent oxy group. Exemplary alkyl groups include methyl, ethyl, n-propyl, iso-propyl, n-butyl, and iso-butyl. Exemplary haloalkyl groups include chloroalkyl groups and fluoroalkyl groups in which some, but not all, of the hydrogen atoms on the corresponding alkyl group are replaced with halo atoms. For example, the chloroalkyl or a fluoroalkyl groups can be chloromethyl, 2-chloroethyl, 2,2,2-trichloroethyl, 3-chloropropyl, 4-chlorobutyl, fluoromethyl, 2-fluoroethyl, 2,2,2-trifluoroethyl, 3-fluoropropyl, 4-fluorobutyl, and the like. Suitable aryl groups for $R^2$ include those having 6 to 12 carbon atoms such as, for example, phenyl. An aryl group can be unsubstituted or substituted with an alkyl (e.g., an alkyl having 1 to 4 carbon atoms such as methyl, ethyl, or n-propyl), an alkoxy (e.g., an alkoxy having 1 to 4 carbon atoms such as methoxy, ethoxy, or propoxy), halo (e.g., chloro, bromo, or fluoro), or alkoxycarbonyl (e.g., an alkoxycarbonyl having 2 to 5 carbon atoms such as methoxycarbonyl, ethoxycarbonyl, or propoxycarbonyl).

The oxalates of formula II can be prepared, for example, by reaction of an alcohol of formula $R^2—OH$ with oxalyl dichloride. Commercially available oxalates of formula II (e.g., from Sigma-Aldrich, Milwaukee, WI and from VWR International, Bristol, CT) include, but are not limited to, dimethyl oxalate, diethyl oxalate, di-n-butyl oxalate, di-tert-butyl oxalate, bis(phenyl)oxalate, bis(pentafluorophenyl) oxalate, 1-(2,6-difluorophenyl)-2-(2,3,4,5,6-pentachlorophenyl) oxalate, and bis (2,4,6-trichlorophenyl) oxalate.

Particularly useful oxalate esters of formula II include, for example, oxalate esters of phenol, methyl ethyl ketone oxime, acetone oxime, and trifluoroethanol; the latter oxalate esters being particularly preferred at present.

Suitable solvents include, for example, tetrahydrofuran, methyl tert-butyl ether, toluene, ethyl acetate, dichloromethane, chloroform and the like, or any solvent that does not interfere with the desired reaction.

As or after the oxalate ester is/has been added to the solvent, polydiorganosiloxane diamine of formula III is added and reacted with the oxalate ester (III)

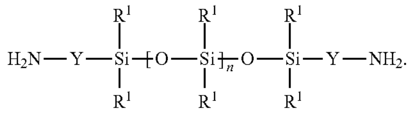

The molar ratio of oxalate ester of formula II to polydiorganosiloxane diamine of formula III is controlled to be at least 1:0.56. A molar ratio of at least 1:0.56 can, under typical observation, ensure that the oxalate ester of formula II is fully consumed in the reaction. As used herein, "fully consumed" and variations thereof means no greater than 5% of the oxalate ester initially added to the solvent remains available for reaction, as detected, for example, by gas chromatography. In other words, at least 95%, at least 96%, at least 97%, at least 98%, at least 99%, or at least 99.5% of the oxalate ester initially added to the solvent is converted during the reaction. Without wishing to be bound by theory, a full consumption of the oxalate ester of formula II aids in maintaining q in Formula I as close to 1 as practicable by limiting the available bond sites for the creation of "runs" of hard segments (i.e., where q equals 2).

The polydiorganosiloxane diamine of formula III can be prepared by any known method and suitable molecular weight, such as a number average molecular weight in the range of 1,000 to 20,000 g/mole. In some presently preferred embodiments, the polydiorganosiloxane diamine of formula III has a number average molecular weight of about 1,000 g/mol to about 15,000 g/mol, and in other presently preferred embodiments the polydiorganosiloxane diamine of formula III has a number average molecular weight of about 10,000 g/mol to about 15,000 g/mol. The present inventors discovered that starting with a polydiorganosiloxane diamine of formula III having a number average molecular weight less than 20,000 g/mol allowed for a comparatively greater total number of hard segments in the copolymers of the present disclosure as compared to starting with a number average molecular weight of, for example, 25,000 g/mol or greater. Without wishing to be bound by theory, an insufficient number of hard segments in the copolymer, as is typically the case when starting with a polydiorganosiloxane diamine of formula III having a number average molecular weight of greater than about 23,000 g/mol, tends to reduce the shear holding strength and other performance characteristics of such adhesives. Moreover, the resulting composition is difficult to coat on many desirable backings and other substrates. Suitable polydiorganosiloxane diamines and methods of making the polydiorganosiloxane diamines are described, for example, in U.S. Pat. No. 3,890,269 (Martin), U.S. Pat. No. 4,661,577 (Jo Lane et al.), U.S. Pat. No. 5,026,890 (Webb et al.), U.S. Pat. No. 5,276,122 (Aoki et al.), U.S. Pat. No. 5,214,119 (Leir et al.), U.S. Pat. No. 5,461,134 (Leir et al.), U.S. Pat. No. 5,512,650 (Leir et al.), and U.S. Pat. No. 6,355,759 (Sherman et al.). Some polydiorganosiloxane diamines are commercially available, for example, from Gelest Inc., Morrisville, PA.

A polydiorganosiloxane diamine having a molecular weight greater than 5,000 g/mole can be prepared using the methods described in U.S. Pat. No. 5,214,119 (Leir et al.), U.S. Pat. No. 5,461,134 (Leir et al.), and U.S. Pat. No. 5,512,650 (Leir et al.). One of the described methods involves combining under reaction conditions and under an inert atmosphere (a) an amine functional end blocker of the following formula

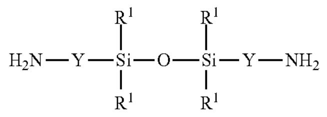

where Y and $R^1$ are the same as defined for formula I'; (b) sufficient cyclic siloxane to react with the amine functional end blocker to form a polydiorganosiloxane diamine having a molecular weight less than 2,000 g/mole; and (c) an anhydrous aminoalkyl silanolate catalyst of the following formula

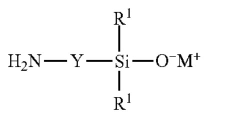

where Y and $R^1$ are the same as defined in formula I' and $M^+$ is a sodium ion, potassium ion, cesium ion, rubidium ion, or tetramethylammonium ion. The reaction is continued until substantially all of the amine functional end blocker is consumed and then additional cyclic siloxane is added to increase the molecular weight. The additional cyclic siloxane is often added slowly (e.g., drop wise). The reaction temperature is often conducted in the range of 80° C. to 90° C. with a reaction time of 5 to 7 hours. The resulting polydiorganosiloxane diamine can be of high purity (e.g., less than 2 weight percent, less than 1.5 weight percent, less than 1 weight percent, less than 0.5 weight percent, less than 0.1 weight percent, less than 0.05 weight percent, or less than 0.01 weight percent silanol impurities). Altering the ratio of the amine end functional blocker to the cyclic siloxane can be used to vary the molecular weight of the resulting polydiorganosiloxane diamine of formula III.

Another method of preparing the polydiorganosiloxane diamine of formula III includes combining under reaction conditions and under an inert environment (a) an amine functional end blocker of the following formula

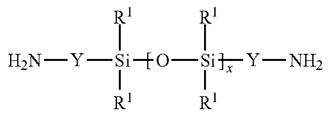

where $R^1$ and Y are the same as described for formula I' and where the subscript x is equal to an integer of 1 to 150; (b) sufficient cyclic siloxane to obtain a polydiorganosiloxane diamine having an average molecular weight greater than the average molecular weight of the amine functional end blocker; and (c) a catalyst selected from cesium hydroxide, cesium silanolate, rubidium silanolate, cesium polysiloxanolate, rubidium polysiloxanolate, and mixtures thereof. The reaction is continued until substantially all of the amine functional end blocker is consumed. This method is further described in U.S. Pat. No. 6,355,759 B1 (Sherman et al.). This procedure can be used to prepare any molecular weight of the polydiorganosiloxane diamine.

Yet another method of preparing the polydiorganosiloxane diamine of formula III is described in U.S. Pat. No. 6,531,620 B2 (Brader et al.). In this method, a cyclic silazane is reacted with a siloxane material having hydroxy end groups as shown in the following reaction.

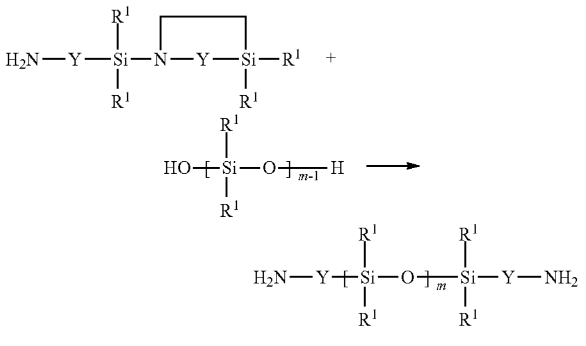

The groups $R^1$ and Y are the same as described for formula I'. The subscript m is an integer greater than 1.

Examples of polydiorganosiloxane diamines include, but are not limited to, polydimethylsiloxane diamine, polydiphenylsiloxane diamine, polytrifluoropropylmethylsiloxane diamine, polyphenylmethylsiloxane diamine, polydiethylsiloxane diamine, polydivinylsiloxane diamine, polyvinylmethylsiloxane diamine, poly(5-hexenyl)methylsiloxane diamine, and mixtures thereof.

The mixture of oxalate ester and polydiorganosiloxane diamine is allowed to react until essentially no polydiorganosiloxane diamine or oxalate ester remains as measured, for example, by gas chromatography. The resulting reaction product, precursor formula IV is formed (IV)

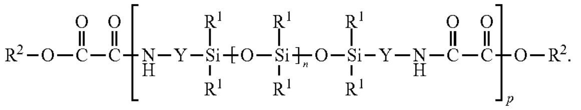

The resulting reaction mixture contains some ester-capped polydiorganosiloxane diamine in which p is dependent upon the amount of oxalate ester utilized and on the nature of the solvent utilized. The reaction mixture typically contains no more than trace (i.e., less than 5% of the initial amount) unreacted oxalate ester of formula II as determined, for example, by gas chromatography.

Next, one or more diamines of formula V are added to the reaction product of formula IV to form the repeat unit of formula I'

(V)

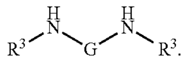

The diamine is typically added in a quantity necessary to consume nearly all the remaining ester groups. This reaction is typically performed in the presence of a catalyst, though the reaction can also be done in the absence of a catalyst. Suitable catalysts include protic acid catalysts, such as acetic acid. Consuming all remaining ester groups at this stage may be sufficient for some implementations, particularly where the diamine of formula V is ethylenediamine (EDA). If capping with the amine-based agents of formula VI different from the diamine of formula V, however, some remaining ester groups are necessary for the capping agents to be added as end groups on the copolymer of formula I'. Next, one or more amine-based capping agents of formula VI are added to reaction of precursor formula IV and the diamines of formula V, (VI)

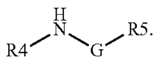

The addition of the amine-based capping agent may also occur in the presence of absence of a protic acid catalyst.

The molar ratio of polydiorganosiloxane diamine of formula III to the diamine(s) of formula V and amine-based capping agents of formula VI (i.e., the amine molar ratio) is often less than or equal to about 1:0.8. The amine molar ratio is selected such that the molar ratio of total amine to ester in the copolymer of formula I' is greater than about 1.0:1.0 (i.e., 0.99:1 to 1.07:1.0). The amount of diamine(s) of formula V added is selected such that the molar ratio of total amine to ester in the copolymer of formula I' is less than about 1.0:1.0 (i.e., 0.95:1 to 0.99:1.0). Varying the amine molar ratio can be used, for example, to alter the overall molecular weight and the number of hard segment "runs", which can affect the rheology of the resulting copolymers. Additionally, varying the molar ratio can be used to provide oxalylamino-containing end groups or amino end groups, depending upon which reactant is present in molar excess.

The amount of amine-based capping agent added at this stage is selected such that the polymerization of the copolymer of formula I' ceases, and all of the remaining ester groups are replaced. Polymerization tends to cease when the molar ratio of total amine to ester in the copolymer of formula I' is greater than about 1.04:1.0. Functionally, the amount of capping agent added is dependent on the amount of diamine of formula V added in the previous stage. For instance, if the addition of diamine brings the amine:ester ratio to 0.97:1.0, a capping agent will be added in an amount sufficient to modify the ratio to at least 1.04:1, if not 1.07:1.0.

The diamines of formula V are sometimes classified as organic diamines. Organic diamines include, for example, those selected from alkylene diamines, heteroalkylene diamines, arylene diamines, aralkylene diamines, or alkylene-aralkylene diamines. The diamine has only two amino groups so that the resulting polydiorganosiloxane polyoxamides and polyoxamide-hydrazides are linear block copolymers that are often elastomeric, molten at elevated temperatures, and soluble in some common organic solvents. The diamine is free of a polyamine having more than two primary or secondary amino groups. Tertiary amines that do not react with the reaction product of formula IV can be present. Additionally, the diamine can be free of any carbonylamino groups in certain embodiments; that is, the diamine is not an amide.

Exemplary polyoxyalkylene diamines (i.e., G is a heteroalkylene with the heteroatom being oxygen) include, but are not limited to, those commercially available from Huntsman, The Woodlands, TX under the trade designation JEFFAMINE D-230 (i.e., polyoxyproprpylene diamine having an average molecular weight of 230 g/mole), JEFFAMINE D-400 (i.e., polyoxypropylene diamine having an average molecular weight of 400 g/mole), JEFFAMINE D-2000 (i.e., polyoxypropylene diamine having an average molecular weight of 2,000 g/mole), JEFFAMINE HK-511 (i.e., polyetherdiamine with both oxyethylene and oxypropylene groups and having an average molecular weight of 220 g/mole), JEFFAMINE ED-2003 (i.e., polypropylene oxide capped polyethylene glycol having an average molecular weight of 2,000 g/mole), and JEFFAMINE EDR-148 (i.e., triethyleneglycol diamine).

Exemplary alkylene diamines (i.e., G is a alkylene) include, but are not limited to, ethylene diamine, propylene diamine, butylene diamine, hexamethylene diamine, 2-methylpentamethylene 1,5-diamine (i.e., commercially available from DuPont, Wilmington, DE under the trade designation DYTEK A), 1,3-pentane diamine (commercially available from DuPont under the trade designation DYTEK EP), 1,4-cyclohexane diamine, 1,2-cyclohexane diamine (commercially available from DuPont under the trade designation DHC-99), 4,4'-bis(aminocyclohexyl)methane, and 3-aminomethyl-3,5,5-trimethylcyclohexylamine.

Exemplary arylene diamines (i.e., G is an arylene such as phenylene) include, but are not limited to, m-phenylene diamine, o-phenylene diamine, and p-phenylene diamine. Exemplary aralkylene diamines (i.e., G is an aralkylene such as alkylene-phenyl) include, but are not limited to 4-aminomethyl-phenylamine, 3-aminomethyl-phenylamine, and 2-aminomethyl-phenylamine. Exemplary alkylene-aralkylene diamines (i.e., G is an alkylene-aralkylene such as alkylene-phenylene-alkylene) include, but are not limited to, 4-aminomethyl-benzylamine, 3-aminomethyl-benzylamine, and 2-aminomethyl-benzylamine.

Exemplary hydrazines (i.e., G is a bond) include, but are not limited to, hydrazine and N,N'-diaminopiperazine.

In some preferred embodiments, the diamine of formula V is selected from the group consisting of 1,2-diaminoethane, 1,3-diaminopropane, 1,4-diaminobutane, 1,5-diaminopentane, 2-methyl-1,5-pentanediamine, 1,6-diaminohexane, and m-xylylenediamine. In presently preferred implementations, the diamine of formula V is 1,2 diaminoethane.

In the amine-based capping agents of formula VI, $R^4$ is hydrogen or methyl; haloalkyl, aralkyl, alkenyl, aryl, or aryl substituted with an alkyl, alkoxy, or halo; G is alkyl (CH2)n, alkyl-aryl (CH2-Ar—CH2), aryl, heteroaryl, heterocycle, or carbocycle; and $R^5$ is hydrogen (as part of alkyl chain or aryl group), aryl, heteroaryl, a primary amine, secondary amine, tertiary amine, amide, carbamate, or urea. Exemplary suitable amine-based capping agents of formula VI include propylamine, n-butylamine, tert-butylamine, aniline, 2-(aminomethyl)pyridine, 4-aminopyridine, benzylamine, N-acetylethylenediamine, and tert-Butyl N-(2-aminoethyl) carbamate (i.e., Boc-ethylenediamine). In presently preferred implementations, the amine based capping agent is N-acetylethylenediamine, and tert-Butyl N-(2-aminoethyl) carbamate.

Any suitable reactor (e.g., a glass vessel or a standard kettle equipped with agitators) or process can be used to prepare the copolymeric material according to the method of the disclosure. The reaction can be conducted using a batch process, semi-batch process, or a continuous process. Exemplary batch processes can be conducted in a reaction vessel equipped with a mechanical stirrer such as a Brabender mixer, provided the product of the reaction is in a molten state has a sufficiently low viscosity to be drained from the reactor. Exemplary semi-batch process can be conducted in a continuously stirred tube, tank, or fluidized bed. Exemplary continuous processes can be conducted in a single screw or twin screw extruder such as a wiped surface counter-rotating or co-rotating twin screw extruder.

The silicone polyoxamide and silicone polyoxamide-hydrazide copolymers of the disclosure are linear block copolymers (i.e., they comprise hard blocks and soft blocks) and can be elastomeric. The silicone polyoxamide and silicone polyoxamide-hydrazide copolymers can be formulated to include at least 93 weight percent polydiorganosiloxane segments (i.e., soft segments) based on the weight of the copolymer. In other embodiments, the silicone polyoxamide copolymers can be formulated to include at least 94 wt. %, at least 95 wt. % at least 96 wt. %, at least 97 wt. %, at least 98 wt. %, at least 99 wt. %, or at least 99.2 wt. % polydiorganosiloxane segments (i.e., soft segments) based on the weight of the copolymer. The weight percent of the diorganosiloxane in the polydiorganosiloxane segments can be controlled by using relatively lower molecular weight polydiorganosiloxanes of formula III.

The copolymers of the disclosure also tend to have improved heat stability. Some of the copolymers of the disclosure, for example, do not flow at or below about 220° C., at or below about 260° C., or even at or below about 300° C. For the purposes of this disclosure, the temperature at which a copolymer flows is defined as the temperature at which the copolymer is sufficiently soft such that it compresses to a thickness of 2 mm in an ARES parallel plate rheometer (available from TA Instruments, New Castle, DE).

The copolymers of the disclosure can be optically clear. As used herein, the term "optically clear" refers to a material that is clear to the human eye. An optically clear copolymeric material often has a luminous transmission of at least 90 percent, a haze of less than 2 percent, and opacity of less than 1 percent in the 400 to 700 nm wavelength range. Both the luminous transmission and the haze can be determined using, for example, the method of ASTM-D 1003-95.

Additionally, the copolymers can have a low refractive index. As used herein, the term "refractive index" refers to the absolute refractive index of a material (e.g., copolymeric material) and is the ratio of the speed of electromagnetic radiation in free space to the speed of the electromagnetic radiation in the material of interest. The electromagnetic radiation is white light. The index of refraction is measured using an Abbe refractometer, available commercially, for example, from Fisher Instruments of Pittsburgh, PA. The measurement of the refractive index can depend, to some extent, on the particular refractometer used. The copolymeric material usually has a refractive index in the range of 1.41 to 1.50.

The copolymers of the present disclosure can be cast from solvents or cast and polymerized as film, molded or embossed in various shapes, or extruded into films. The high temperature stability of the copolymeric material makes them well suited for extrusion methods of film formation. The films can be optically clear. A multilayer film containing polydiorganosiloxane polyoxamide block copolymers is described, for example, in U.S. Pat. No. 7,820,297 (Benson et al.).

The copolymers of the disclosure are useful in various articles. The articles, for example, can include a layer containing the copolymer of the disclosure and one or more optional substrates. For example, the copolymer of the disclosure can be in a layer adjacent to a first substrate or positioned between a first substrate and a second substrate. That is, the article can be arranged in the following order: a first substrate, a layer containing the copolymer of the disclosure, and a second substrate. As used herein, the term "adjacent" refers to a first layer that contacts a second layer or that is positioned in proximity to the second layer but separated from the second layer by one or more additional layers.

The copolymers of the disclosure are also useful as low adhesion backsize coatings.

Adhesive Compositions Featuring Silicone Polyoxamide Copolymers

The silicone polyoxamide copolymers of the disclosure can be formulated into adhesive compositions such as pressure sensitive adhesives and heat activated adhesives that contain a tackifier. Such adhesive compositions are further described, for example, in U.S. Pat. No. 7,371,464 (Sherman et al.) and U.S. Pat. No. 8,691,391 (Sherman et al). The copolymers of the disclosure can be formulated into both stretch release and peel release compositions. In embodiments featuring a stretch releasable adhesive, the article can be removed from a substrate or surface by stretching it at an angle of less than 35°. In embodiments featuring a peel-releasable (i.e., peelable) adhesive, the article is a single or multilayer construction that can be removed from a substrate or surfaces by stretching it an angle of 35° or greater. In some embodiments, the releasable adhesive may be removed by a combination of stretch and peel-release mechanisms.

Additionally, the copolymers of the disclosure can be used as a hot melt adhesive. Typically, the hot melt adhesive contains little or no tackifier. The hot melt adhesives can be used, for example, to bond two surfaces together into a composite. That is, the hot melt adhesive can be used to bond a first substrate to a second substrate with the hot melt adhesive positioned between the first and second substrates. During application to a surface such as the surface of a substrate, hot melt adhesives are desirably sufficiently fluid to wet the surface completely and leave no voids, even if the surface is rough. Such an adhesive composition typically has a low viscosity at the time of application and then sets into a solid upon cooling. The cohesive strength develops upon cooling. Alternatively, the hot melt adhesive composition can be formulated with a solvent or carrier that lowers the viscosity sufficiently to permit wetting of the surface. The solvent or carrier can then be removed to provide a solid coating having cohesive strength.

Tackifiers, plasticizers, and other property modifiers may be formulated into adhesive compositions including the copolymers of the disclosure. Preferred optional additives are not hot melt processable. That is, they do not melt and flow at the temperatures at which the copolymer of the disclosure melts and flows.

Tackifying materials or plasticizers useful with the polymeric materials are preferably miscible at the molecular level, e.g., soluble in, any or all of the polymeric segments of the elastomeric material or the thermoplastic elastomeric material. Examples of tackifiers suitable for the disclosure include but are not limited to silicone fluids, liquid rubbers, hydrocarbon resins, rosin, natural resins such as dimerized or hydrogenated balsams and esterified abietic acids, polyterpenes, terpene phenolics, phenol-formaldehyde resins, and rosin esters. Examples of plasticizers include but are not limited to polybutene, paraffinic oils, petrolatum, and certain phthalates with long aliphatic side chains such as ditridecyl phthalate.

Other suitable tackifiers include silicate tackifying resins. Suitable silicate tackifying resins include those resins composed of the following structural units M (i.e., monovalent $R_3SiO_{1/2}$ units), D (i.e., divalent $R_2SiO_{2/2}$ units), T (i.e., trivalent $RSiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000 or in the range of 500 to 15,000 and generally have methyl R groups.

MQ silicate tackifying resins are copolymeric resins having $R_3SiO_{1/2}$ units ("M" units) and $SiO_{4/2}$ units ("Q" units), where the M units are bonded to the Q units, each of which is bonded to at least one other Q unit. Some of the $SiO_{4/2}$ units ("Q" units) are bonded to hydroxyl radicals resulting in $HOSiO_{3/2}$ units ("TOH" units), thereby accounting for the silicon-bonded hydroxyl content of the silicate tackifying resin, and some are bonded only to other $SiO_{4/2}$ units.

Such resins are described in, for example, Encyclopedia of Polymer Science and Engineering, vol. 15, John Wiley & Sons, New York, (1989), pp. 265-270, and U.S. Pat. No. 2,676,182 (Daudt et al.), U.S. Pat. No. 3,627,851 (Brady), U.S. Pat. No. 3,772,247 (Flannigan), and U.S. Pat. No. 5,248,739 (Schmidt et al.). Other examples are disclosed in U.S. Pat. No. 5,082,706 (Tangney). The above-described resins are generally prepared in solvent. Dried or solventless, M silicone tackifying resins can be prepared, as described in U.S. Pat. No. 5,319,040 (Wengrovius et al.), U.S. Pat. No. 5,302,685 (Tsumura et al.), and U.S. Pat. No. 4,935,484 (Wolfgruber et al.).

Certain MQ silicate tackifying resins can be prepared by the silica hydrosol capping process described in U.S. Pat. No. 2,676,182 (Daudt et al.) as modified according to U.S. Pat. No. 3,627,851 (Brady), and U.S. Pat. No. 3,772,247 (Flannigan). These modified processes often include limiting the concentration of the sodium silicate solution, and/or the silicon-to-sodium ratio in the sodium silicate, and/or the time before capping the neutralized sodium silicate solution to generally lower values than those disclosed by Daudt et al. The neutralized silica hydrosol is often stabilized with an alcohol, such as 2-propanol, and capped with $R_3SiO_{1/2}$ siloxane units as soon as possible after being neutralized. The level of silicon bonded hydroxyl groups (i.e., silanol) on the MQ resin may be reduced to no greater than 1.5 weight percent, no greater than 1.2 weight percent, no greater than 1.0 weight percent, or no greater than 0.8 weight percent based on the weight of the silicate tackifying resin. This may be accomplished, for example, by reacting hexamethyldisilazane with the silicate tackifying resin. Such a reaction may be catalyzed, for example, with trifluoroacetic acid. Alternatively, trimethylchlorosilane or trimethylsilylacetamide may be reacted with the silicate tackifying resin, a catalyst not being necessary in this case.

MQD silicone tackifying resins are terpolymers having $R_3SiO_{1/2}$ units ("M" units), $SiO_{4/2}$ units ("Q" units), and $R_2SiO_{2/2}$ units ("D" units) such as are taught in U.S. Pat. No. 2,736,721 (Dexter). In MQD silicone tackifying resins, some of the methyl R groups of the $R_2SiO_{2/2}$ units ("D" units) can be replaced with vinyl ($CH_2{=}CH{-}$) groups ("DVi" units).

MQT silicate tackifying resins are terpolymers having $R_3SiO_{1/2}$ units, $SiO_{4/2}$ units and $RSiO_{3/2}$ units ("T" units) such as are taught in U.S. Pat. No. 5,110,890 (Butler) and Japanese Kokai HE 2-36234.

Suitable silicate tackifying resins are commercially available from sources such as Dow Corning, Midland, MI; Momentive Performance Materials, Albany, NY; and Rhodia Silicones, Rock Hill, SC. Examples of particularly useful MQ silicate tackifying resins include those available under the trade designations SR-545 and SR-1000, both of which are commercially available from Momentive Performance Materials, Albany, NY. Such resins are generally supplied in organic solvent and may be employed in the formulations of the adhesives of the present disclosure as received. Blends of two or more silicate resins can be included in the adhesive compositions.

Either pressure sensitive adhesives or heat activated adhesives can be formulated by combining the silicone polyoxamide and/or silicone polyoxamide-hydrazide copolymers and a silicate tackifying resin with inorganic particles or other filler. The inorganic particles included in the adhesive composition tend to enhance the performance of the resulting adhesive. More particularly, the inorganic particles tend to increase the cohesive strength of the pressure-sensitive adhesive and tend to increase the rubbery plateau modulus. The inorganic particles can be uniformly or non-uniformly distributed throughout the pressure-sensitive adhesive composition. The inorganic particles can be any suitable metal, metal alloy, metal oxide, ceramic material, or mixture thereof. The inorganic particles are often selected from, but not limited to, alumina, titania, zirconia, silica, or the like.

In many embodiments, the inorganic particles are fumed silica particles. Suitable fumed silica is commercially available, for example, under the trade designation AEROSIL (e.g., AEROSIL R972, R974, R976, R300, R380, R130, R150, R200, R202, R805, and R812) from Evonik Industries (Essen, Germany) or under the trade designation CABOSIL (e.g., CABOSIL TS-720, TS-610, TS-530, and TS-500) from Cabot (Alpharetta, GA). The fumed silica can have any suitable surface area. For example, the surface area can be in the range of 1 to 500 $m^2$/gram, in the range of 10 to 400

$m^2$/gram, or in the range of 100 to 400 $m^2$/gram. The fumed silica can have any suitable particle size. In some applications, the fumed silica has an average primary particle size less than 30 microns, less than 15 microns, less than 10 microns, less than 5 microns, and less than 1 micron. While nanoscale fumed silica may be used in certain implementations, the use of fumed silica having an average primary particle size less than 200 nanometers may result in substrate damage. Although either hydrophobic or hydrophilic fumed silica can be used, hydrophobic fumed silica is often used because such particles tend to disperse better in the organic solvents typically included in the various compositions.

In other embodiments, the inorganic particles are aerogels such as silica aerogel particles (e.g., crushed aerogels or aerogel powder). The silica aerogel particles often have pores in the nanometer range (e.g., less than 100 nanometers or less than 50 nanometers) and have surface areas equal to at least 500 $m^2$/gram. Exemplary aerogel silica particles can have an average particle size that is less than 20 microns or less than 10 microns. Although the size of the silica aerogel particles is larger than the wavelength of light, the particles are often translucent and can be used to form adhesive layers that are relatively clear even though they may not be considered to be optically clear. Exemplary silica aerogel particles in translucent and opacified grades are commercially available under the trade designation NANOGEL from Cabot (Billerica, MA).

Although the inorganic particles can be surface modified to facilitate dispersion in the silicone polymer or the adhesive composition, the inorganic particles are often not surface modified. The inorganic particles can be agglomerated or non-agglomerated and aggregated or non-aggregated. The inorganic particles can have any desired particle size or particle shape. If an optically clear adhesive article is desired, the inorganic particles are often selected to have an average particle size that is less than 1000 nanometers. For example, the average particle size is often less than 500 nanometers, less than 200 nanometers, less than 100 nanometers, or less than 50 nanometers. To prepare adhesive articles that do not need to be optically clear, larger inorganic particles can be used. For example, the inorganic particles can have an average particle size up to 5 micrometers, up to 10 micrometers, up to 20 micrometers, up to 50 micrometers, or up to 100 micrometers.

The adhesive compositions can further optionally include other additives to provide desired properties. For example, dyes and pigments can be added as colorant; electrically and/or thermally conductive compounds can be added to make the adhesive electrically and/or thermally conductive or antistatic; antioxidants and antimicrobial agents can be added; and ultraviolet light stabilizers and absorbers, such as hindered amine light stabilizers (HALS), can be added to stabilize the adhesive against ultraviolet degradation and to block certain ultraviolet wavelengths from passing through the article. Other additives include, but are not limited to, adhesion promoters, additional fillers (e.g., carbon fibers, carbon black, glass beads, glass and ceramic bubbles, glass fibers, mineral fibers, clay particles, organic fibers such as nylon, metal particles, or unexpanded polymeric microspheres), tack enhancers, blowing agents, hydrocarbon plasticizers, and flame-retardants.

The copolymers of the present disclosure are typically present in adhesive compositions in quantities of at least 20 wt. % and no greater than 80 wt. %, based on the total weight of the adhesive composition, or any amount within that range. In certain implementations, it may be preferred that the copolymer is present at a concentration of at least 30 wt. % and no greater than 75 wt. %, based on the total weight of the adhesive composition.

The tackifier is typically added to the composition to at least 10 wt. %, in some embodiments at least 30 wt. %, in some embodiments at least 40 wt. %, in some embodiments at least 50 wt. %, based on the total weight of the adhesive composition. The tackifier is typically present in composition at no greater than 70 wt. %, no greater than 65 wt. %, and in some embodiments no greater than 60 wt. % based on the total weight of the adhesive composition. In typical adhesive compositions used for mounting applications herein, the tackifier is present in the composition at no greater than about 60 wt. % and no less than 40 wt. %. Without wishing to be bound by theory, a level of tackifier above about 60 wt. % can, in certain conditions, mean the tackifier assumes the continuous phase of the composition in favor of the copolymer. Adhesive compositions with a tackifier forming the continuous phase tend to exhibit at least one of poor tack, poor adhesion poor shear holding strength, and insufficiently damage-free removal.

Typically, the inorganic particles, if used as filler, will be added to a level of about 0.1% to about 20% by weight based upon the total weight of the adhesive composition, or any amount within that range. In presently preferred implementations the inorganic particles are added to a level of about 3% to about 15% by weight, and more preferably 5% to 12% by weight based upon the total weight of the adhesive composition.

Adhesive Articles

An adhesive article typically includes a substrate and an adhesive layer adjacent to at least one surface of the substrate. Other adhesive articles of the present disclosure may be backing or substrate free. Backing free adhesive constructions are described, for example, in US Publication No. 2016/0068722 (Schmitz-Stapela et al.). The adhesive layer includes the adhesive compositions including the copolymers described herein. The substrates can include a single layer of material or can be a combination of two or more materials.

The substrates can have any useful form including, but not limited to, films, sheets, membranes, filters, nonwoven or woven fibers, hollow or solid beads, bottles, plates, tubes, rods, pipes, or wafers. The substrates can be porous or non-porous, rigid or flexible, transparent or opaque, clear or colored, and reflective or non-reflective. The substrates can have a flat or relatively flat surface or can have a texture such as wells, indentations, channels, bumps, or the like. The substrates can have a single layer or multiple layers of material. Suitable substrate materials include, for example, polymeric materials, glasses, ceramics, sapphire, metals, metal oxides, hydrated metal oxides, or combinations thereof.

Suitable polymeric substrate materials include, but are not limited to, polyolefins (e.g., polyethylene such as biaxially oriented polyethylene or high density polyethylene and polypropylene such as biaxially oriented polypropylene), polystyrenes, polyacrylates, polymethacrylates, polyacrylonitriles, polyvinyl acetates, polyvinyl alcohols, polyvinyl chlorides, polyoxymethylenes, polyesters such as polyethylene terephthalate (PET), polytetrafluoroethylene, ethylene-vinyl acetate copolymers, polycarbonates, polyamides, rayon, polyimides, polyurethanes, phenolics, polyamines, amino-epoxy resins, polyesters, silicones, cellulose based polymers, polysaccharides, nylon, neoprene rubber, or combinations thereof. Some polymeric materials are foams, woven fibers, non-woven fibers, or films.

Suitable glass and ceramic substrate materials can include, for example, silicon, aluminum, lead, boron, phosphorous, zirconium, magnesium, calcium, arsenic, gallium, titanium, copper, or combinations thereof. Glasses typically include various types of silicate containing materials.

Some substrates are release liners. The adhesive layer can be applied to a release liner and then transferred to another substrate such as a backing film or foam substrate. Suitable release liners typically contain a polymer such as polyester or polyolefin or a coated paper. Some adhesive articles transfer tape that contains an adhesive layer positioned between two release liners. Exemplary release liners include, but are not limited to, polyethylene terephthalate coated with a fluorosilicone such as that disclosed in U.S. Pat. No. 5,082,706 (Tangney) and commercially available from Loparex, Inc., Bedford Park, IL. The liner can have a microstructure on its surface that is imparted to the adhesive to form a microstructure on the surface of the adhesive layer. The liner can be removed to provide an adhesive layer having a microstructured surface.

In some embodiments, the adhesive article is a single sided adhesive tape in which the adhesive layer is on a single major surface of a substrate such as a foam or film. In other embodiments, the adhesive article is a double-sided adhesive tape in which the adhesive layer is on two major surfaces of a substrate such as a foam or film. The two adhesive layers of the double-sided adhesive tape can be the same or different. For example, one adhesive can be a pressure sensitive adhesive and the other a heat activated adhesive where at least one of the adhesives is based on the copolymer described herein. Each exposed adhesive layer can be applied to another substrate.

The adhesive articles can contain additional layers such as primers, barrier coatings, metal and/or reflective layers, tie layers, and combinations thereof. The additional layers can be positioned between the substrate and the adhesive layer, adjacent the substrate opposite the adhesive layer, or adjacent to the adhesive layer opposite the substrate.

In some embodiments, the adhesive articles can further include a separable connector. Some exemplary separable connectors are described in, for example, U.S. Pat. Nos. 6,572,945; 7,781,056; 6,403,206; and 6,972,141.

Some adhesive articles of the present disclosure have excellent shear strength. Some embodiments of the present disclosure have a shear strength of greater than 1800 minutes as measured according to ASTM D3654-82, as modified according to the Static Shear Test Method below. Some embodiments of the present disclosure have shear strength of greater than 10,000 minutes as measured according to modified ASTM D3654-82. Some embodiments of the present disclosure have shear strength of greater than 50,000 minutes as measured according to modified ASTM D3654-82.

Some adhesive articles of the present disclosure demonstrate excellent shear strength in humid or wet environments, such as a bathroom or tropical locale. Some adhesive articles have a shear strength of greater than 10,000 minutes as measured according to ASTM D3654-82, as modified according to the CTH Static Shear Test Method below. Some adhesive articles have a shear strength of greater than 20,000 minutes as measured according to ASTM D3654-82.

Some adhesives that can be used in the adhesive articles of the present disclosure have a glass transition temperature of about −125° C. to 15° C., as determined by dynamic mechanical analysis of the tan δ peak value. Some adhesives that can be used in the adhesive articles of the present disclosure have a storage modulus of about 400,000 Pa or less, or 300,000 or less at 25° C., as determined by dynamic mechanical analysis.

In some embodiments, the thickness of the adhesive on at least one of the first or second major surfaces of the multilayer carrier is about 1 μm to about 1 mm.

Some adhesive articles of the present disclosure have an elongation at break of greater than 50% in at least one direction. Some adhesive articles of the present disclosure have an elongation at break of between about 50% and about 1200% in at least one direction.

Some adhesive articles of the present disclosure have a tensile strength at break sufficiently high so that the adhesive article will not rupture prior to being removed from an adherend at an angle of 35° or less.

Some adhesive articles of the present disclosure have a lower peel force to make the adhesive article easier to remove (e.g., a force between about 25 oz/in to about 50 oz/in). Some adhesive articles of the present disclosure can have a higher peel force as to permit handling of the adhesive article by the user without accidental separation (e.g., a force between about 50 oz/in to 100 oz/in). Some embodiments of the present disclosure have a peel force between about 20 oz/in to 90 oz/in. Some embodiments of the present disclosure have a peel force between about 30 oz/in to 70 oz/in.

Some adhesive articles of the present disclosure demonstrate a reduced adhesion to common fluorosilicone release liners, leading to a lower peel force needed to remove an adhesive layer form the liner.

Some adhesive articles of the present disclosure have a tensile strength at break sufficiently high so that the adhesive article will not rupture prior to being removed from an adherend at an angle of 35° or greater.

Some adhesive articles of the present disclosure can be removed from a substrate, wall, or surface (generally, an adherend) without damage. As used herein, the terms “without damage” and “damage-free” or the like means the adhesive article can be separated from the substrate without causing visible damage to paints, coatings, resins, coverings, or the underlying substrate and/or leaving behind residue. Visible damage to the substrates can be in the form of, for example, scratching, tearing, delaminating, breaking, crumbling, straining, blistering, bubbling, and the like to any layers of the substrate. Visible damage can also be discoloration, weakening, changes in gloss, changes in haze, or other changes in appearance of the substrate.

A method of making an adhesive article typically includes providing a substrate and applying an adhesive composition to at least one surface of the substrate. The adhesive composition can be applied to the substrate by a wide range of processes such as, for example, solution coating, solution spraying, hot melt coating, extrusion, coextrusion, lamination, and pattern coating. The adhesive composition is often applied as an adhesive layer to a surface of substrate with a coating weight of 0.02 grams/154.8 $cm^2$ to 2.4 grams/154.8 $cm^2$.

The adhesive articles of the disclosure may be exposed to post processing steps such as curing, crosslinking, die cutting, heating to cause expansion of the article, e.g., foam-in-place, and the like. The adhesive articles featuring adhesive compositions of the present disclosure can be used in various ways. In some embodiments, the adhesive article is applied, attached to, or pressed into an adherend. In this way, the adhesive article contacts the adherend. Where a release liner is present, the release liner is removed before the adhesive article is applied, attached to, or pressed into an adherend. In some embodiments, at least a portion of the adherend is wiped with alcohol before the adhesive article is applied, attached to, or pressed into an adherend.

The adhesive articles may be used in wet or high humidity environments such as those found in bathrooms. For example, they can be adhered to toilets (e.g., toilet tanks), bathtubs, sinks, and walls. The adhesive article may be used in showers, locker rooms, steam rooms, pools, hot tubs, and kitchens (e.g., kitchen sinks, dishwashers and back splash areas, refrigerators and coolers). The adhesive article may also be used in low temperatures applications including outdoor applications and refrigerators. Useful outdoor applications include bonding articles such as signage to outdoor surfaces such as windows, doors and vehicles.

The adhesive article (i.e., those in adhesive tapes or single article) can be provided in any useful form including, e.g., tape, strip, sheet (e.g., perforated sheet), label, roll, web, disc, and kit (e.g., an object for mounting and the adhesive tape used to mount the object). Likewise, multiple adhesive articles can be provided in any suitable form including, e.g., tape, strip, sheet (e.g., perforated sheet), label, roll, web, disc, kit, stack, tablet, and combinations thereof in any suitable package including, for example, dispenser, bag, box, and carton.

To remove the adhesive article from the adherend, at least a portion of the adhesive article is peeled or stretched away from the adherend. In some embodiments, the angle of stretch is 35° or less. In embodiments where a tab is present, the user can grip the tab and use it to release or remove the adhesive article from the adherend.

The adhesive articles may be used to mount various items and objects to surfaces such as painted drywall, plaster, concrete, glass, ceramic, fiberglass, metal or plastic. Items that can be mounted include, but are not limited to, wall hangings, organizers, holders, baskets, containers, anti-slip mats, decorations (e.g., holiday decorations), calendars, posters, dispensers, wire clips, body side molding on vehicles, carrying handles, signage applications such as road signs, vehicle markings, transportation markings, and reflective sheeting.

The adhesive articles may be used to mount items and materials, such as anti-slip mats or anti-fatigue mats, to a floor surface or the bottom of a tub or shower, or to secure items, such as area rugs, to a floor. The adhesive article can be used in various joining and assembling applications including such as adhering at least two containers (e.g., boxes) for later separation. The adhesive article can be used in various cushioning and sound deadening applications such as, for example, cushioning materials for placement beneath objects, sound insulating sheet materials, vibration dampening, and combinations thereof. The adhesive article can be used in various closure applications including container closures (e.g., box closures, closures for food containers, and closures for beverage containers), diaper closures, and surgical drape closures. The adhesive article can be used in various thermal insulation applications. The adhesive article can be used in various sealing applications such as in gaskets for liquids, vapors (e.g., moisture), and dust. The adhesive article can be used in various labels such as removable labels (e.g., notes, price tags, and identification labels on containers), and in signage. The adhesive article can be used in various medical applications (e.g., bandages, wound care, and medical device labeling such as in a hospital setting). The adhesive article can be used in various fastening applications such as fastening one object (e.g., a vase or other fragile object) to another object (e.g., a table or a book shelf). The adhesive article can be used in various securing applications such as fastening one or more components of a locking mechanism to a substrate (e.g., a child safety lock can be adhered to a cabinet or cupboard). The adhesive article can be used in various tamper indicating applications (e.g., tamper indicating articles). The adhesive article can also be incorporated in a variety of other constructions including, but not limited to, abrasive articles (e.g., for sanding), articles for sanding and polishing applications (e.g., buffing pads, disc pads, hand pads, and polishing pads), pavement marking articles, carpeting (e.g., backing for carpeting), and electronic devices (e.g., securing a battery within a housing in a cell phone or PDA (personal digital assistant) to prevent unwanted movement).

The foregoing describes the disclosure in terms of embodiments foreseen by the inventor for which an enabling description was available, notwithstanding that insubstantial modifications of the disclosure, not presently foreseen, may nonetheless represent equivalents thereto.

EXAMPLES

These examples are merely for illustrative purposes only and are not meant to be limiting on the scope of the appended claims. Unless otherwise noted or readily apparent from the context, all parts, percentages, ratios, etc. in the Examples and the rest of the specification are by weight.

Materials

Solvents were obtained from EMD Chemicals, Gibbstown, NJ unless otherwise noted.

| Abbreviation | Description and Source |
| --- | --- |
| PDMS diamine | A polydimethylsiloxane diamine of the following formula 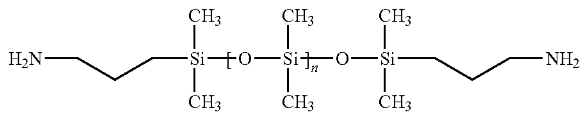 with a number average molecular weight of between approximately 10,000 g/mole (10K) and 15,000 g/mole (15k) prepared according to U.S. Pat. No. 5,214,119. |
| BTFEO | Bis(2,2,2-trifluoroethyl)oxalate was prepared according to U.S. Pat. No. 8,765,881. |
| EtOAc | Ethyl acetate was obtained from Honeywell (Morrisville, NJ) and dried over 4Å molecular sieves prior to use. |
| AcOH | Acetic acid obtained from Alfa Aesar (Ward Hill, MA). |
| EDA | Ethylene diamine obtained from Alfa Aesar (Ward Hill, MA). |
| allyl | Allylamine obtained from Alfa Aesar (Ward Hill, MA). |

-continued

| Abbreviation | Description and Source |
|---|---|
| butyl | Butyl amine obtained from TCI America (Portland, OR). |
| $Me_2$-eth | N,N-Dimethylethylenediamine obtained from Oakwood Chemical (Estill, SC). |
| $Me_2$-prop | N,N-Dimethyl-1,3-propanediamine obtained from Alfa Aesar (Ward Hill, MA). |
| Me-eth | N-Methylethylenediamine obtained from Alfa Aesar (Ward Hill, MA). |
| Me-prop | N-Methyl-1,3-propanediamine obtained from Alfa Aesar (Ward Hill, MA). |
| morph | Morpholine obtained from Alfa Aesar (Ward Hill, MA). |
| Ac-eth | N-Acetylethylenediamine obtained from TCI America (Portland, OR). |
| benzyl | Benzylamine obtained from Alfa Aesar (Ward Hill, MA). |
| Boc-eth | tert-Butyl N-(2-aminoethyl)carbamate obtained from Oakwood Chemical (Estill, SC). |
| $NH_2CH_2$pyr | 3-(Aminomethyl)pyridine obtained from Alfa Aesar (Ward Hill, MA). |
| MQ resin | Momentive SR545, Momentive Performance Materials LLC (Waterford, NY) |
| IPA | Isopropanol obtained from VWR International LLC (Radnor, PA) |

Test Methods

Titration Method to Determine Amine Equivalent Weight (AEW) of PDMS Diamines

The amine equivalent weight (AEW) of PDMS diamines were determined in tetrahydrofuran (THF) using standardized HCl (0.1N) and titrating against a bromophenol blue endpoint.

Inherent Viscosity (IV)

Inherent viscosity measurements were performed at 27° C. on a LAUDA PVS 1 viscosity system obtained from Lauda-Brinkman (Delran, NJ) utilizing size 50 capillary viscometers (Part #9721-A00) or from Cannon Instrument Company (State College, PA) or on an automated mini PV-HX Single-Bath Dilute Solution Polymer Viscometer with size 0B viscometer tube (Part #12.0548) obtained from Cannon Instrument Company (State College, PA). All polymer samples were analyzed as an EtOAc solution at a concentration of 0.2 grams/deciliter and IV measurements are reported in units of deciliters/gram (dL/g).

Gas Chromatography (GC)

Gas chromatographic analysis was performed on an HP-6890 series instrument using an HP-1 column (30 m×0.250 mm, 1.0 micron) obtained from Agilent (Santa Clara, CA). Samples were injected undiluted as a 30 wt % polymer solution in ethyl acetate.

Measurement of % Solids

Solids content (% solids) was measured by weighing a gram of polymer solution into an aluminum tin, then drying in an oven at 150° C. for 1 h. All samples were measured in triplicate and reported values are the average.

Test Adherends

Drywall panels (obtained from Materials Company, Metzger Building, St. Paul, MN) were painted with Behr PREMIUM PLUS ULTRA® Primer and Paint 2 in 1 Flat Egyptian Nile (FEN) obtained from Behr Process Corporation, Santa Ana, CA), Sherwin-Williams DURATION®, Interior Acrylic Latex Ben Bone White Paint SWBB) obtained from Sherwin-Williams Company, Cleveland, OH) or Valspar Reserve Superior Blue with Satin Sheen (BO) (bought from Lowes).

Procedure for painting: a first coat of paint was applied to a panel using a paint roller, followed by air drying for 24 hours at ambient conditions. A second coat of paint was applied and dried at ambient conditions for 24 hours. The panel was placed in a forced air oven set to 50° C. for 7 days. Then the panel was then stored at ambient conditions until use.

Panels of glass and painted drywall measuring 2 in×2 in (5.1 cm×5.1 cm) were used for Shear Strength testing. Panels of glass and painted drywall measuring 6 in×12 in (15.2 cm×30.5 cm) were used for Peel Adhesion and Package Weight Claim testing at 72° F./75 RH %.

Static Shear Test Method

Static shear was determined according to the method of ASTM D3654-82 entitled, "Holding Power of Pressure-Sensitive Tapes," with the following modifications. The release liner(s), where present, was removed from the test sample. Test samples having the dimensions 0.5 in×0.5 in (1.91 cm×1.91 cm) were adhered to the test substrate through the adhesive composition at 72° F. (22° C.) and 50% relative humidity (CTH) by passing a 15 lb. (6.8 kg) hand held roller over the length of the sample two times at a rate of 12 in/min (30.48 cm/min). A metal vapor coated polyester film having the dimensions 0.75 in×4 in (1.91 cm×10.16 cm) was bonded to one side of the adhesive test sample for the purpose of attaching the load.

The test sample was allowed to dwell on the test substrate for 1 hour at 22° C. and 50% relative humidity; thereafter a 2.2 lb. (1 kg) weight was applied to the metal vapor coated polyester film. In case of high humidity experiments, the samples were dwelled on the test substrate for 1 hour at 90° F./90% RH (32.2° C./90% RH) in a Thermotron humidity chamber and tested in the same environment for the duration of test. The time to failure was recorded in minutes and the average value, calculated pursuant to procedures A and C of section 10.1 of the standard, for all of the test samples was reported. Three samples were tested and the average time to failure of the three samples and the failure mode of each sample was recorded. A value was reported with a greater than symbol (i.e., >) when at least one of the three samples had not failed at the time the test was terminated.

Package Weight Claim Test (PWC)

Multi-layer composite tape samples were used to fulfill the package weight claim test. The test was performed using medium size COMMAND utility hooks (Type 17001ES, available from 3M Company, St. Paul, MN). Test samples were cut into ⅝ in×2 in (1.6 cm×5.1 cm) strips. The first adhesive side of the test sample was first applied to the substrate (i.e., Painted drywall, Tile or glass) by hand and then adhered to the substrate by passing a 15 lb. (6.8 kg) hand held roller over the length of the sample two times at a rate of 12 in/min (30.48 cm/min). In the next step, the backplate or mounting base of the COMMAND utility hook was applied to the opposing first adhesive side of the test sample. Finally the hook was attached to the backplate. The samples were mounted in a vertical position and allowed to dwell on the test substrate for 60 minutes at ambient conditions (between 69-72° F. (21-22° C.) and 10-40% relative humidity, depending on the time of year) before attaching a load to the test sample (3 lb weights). Samples were hung until failure or until 30 days had elapsed. Failure was indicated when it was observed that hook article completely fell off the test substrate (the adhesive no longer adhered to the test substrate surface). The Package Weight Claim data in the Tables is provided as Weight Holding Power (days). The data are an average of 3 tests.

Some package weight testing was performed with medium size COMMAND Utility hook (strip size: ⅝"×2", available from 3M Company) on FEN, BB or BO painted drywalls in 72° F./75% RH condition.

Also some package weight testing was carried out in a shower spray chamber at 95% RH using a continuous $H_2O$ spray with a water temperature of 105° F.-120° F. (41° C.-49° C.). Medium size COMMAND Utility hook (strip size: ⅝"×2", available from 3M Company) were used in this test. Samples were adhered to White Glazed Ceramic Wall Tile (Interceramic, Carollton, TX), and the load on the samples was 3 lbs.

Liner Peel Release Test

Samples were tested at CTH conditions.

Easy Side:

A 2.54 cm wide and approximately 20 cm long sample of the adhesive transfer tape on liner was cut using a specimen razor cutter. At least 4 transfer adhesive tapes prepared as described below were laid down on top of each other such that the adhesive side on each strip was brought in contact with the liner side of the next strip. The stack of at least two strips was applied lengthwise onto the platen surface of a peel adhesion tester (an IMASS SP-2100 tester, obtained from IMASS, Inc., Accord, MA) using 3M Double Coated Paper Tape 410M (available from 3M Company, St. Paul, MN, USA). The top strip was peeled from the liner underneath at an angle of 180 degrees at, e.g., 60 in/min (152.4 cm/min) The average force required to peel three strips from their underneath counterparts was recorded as the easy side liner release (as grams per inch).

Tight Side:

A 2.54 cm wide and approximately 20 cm long sample of the adhesive transfer tape on liner was cut using a specimen razor cutter. The cut sample was applied lengthwise onto the platen surface of a peel adhesion tester (an IMASS SP-2100 tester, obtained from IMASS, Inc., Accord, MA) using 3M Double Coated Paper Tape 410M (available from 3M Company, St. Paul, MN, USA). The release liner was peeled from the adhesive at an angle of 180 degrees at, e.g., 12 in/min (30.5 cm/min). The average force required to peel three liners from the adhesives was recorded as the tight side liner release (as grams per inch).

Peel Adhesion Test

The peel adhesion test was performed by the following method. A vapor coated metalized PET was applied to the transfer tape first. Then multiple strips of 2.54 cm wide and approximately 20 cm long samples were cut using a specimen razor cutter. At least 3 transfer adhesive tapes with PET backing were applied to a glass adherend, after removing the liner and then rolling down with a 4.5 lbs roller. Adhered samples were aged at 72° F. (22° C.) and 50% RH (CTH) conditions for at least a 1 hour dwell time before testing, unless otherwise stated in the result table. The strips were peeled from the panel using a peel adhesion tester (MASS SP-2100 tester, obtained from IMASS, Inc., Accord, MA) with a crosshead speed of 12 in/min (30.5 cm/min), unless otherwise indicated. The peel force was measured, and the panels were observed to see if visible adhesive residue remained on the panel. The peel data in the Tables represent an average of three tests.

Preparation of Adhesive Transfer Tapes

Pressure sensitive adhesive compositions were knife-coated onto a paper liner web having a fluoroalkyl silicone release surface. The paper liner web speed was 2.75 meter/min. After coating, the web was passed through an oven 11 meters long (residence time 4 minutes total) having three temperature zones. The temperature in zone 1 (2.75 meter) was 57° C.; temperature in zone 2 (2.75 meter) was 80° C.; temperature in zone 3 (about 5.5 meter) was 93° C. The caliper of the dried adhesive was approximately 2.5-3.0 mils thick. The adhesive transfer adhesive tapes were then stored at ambient conditions.

Multi-Layer Composite Tape Preparation

For shear and package weight claim, the transfer adhesives of the example set were laminated to film-foam-film composites and the desired size and geometry was die cut. In specific, the test adhesive composition was adhered to the both sides of a composite film-foam-film construction like that found on COMMAND strip products (31 mil 6 lb. foam with 1.8 mil polyethylene film on both sides of the foam). Both sides of the film-foam-film construction were previously primed with 3M Adhesion Promoter 4298UV (3M Company, St. Paul, MN) prior to adhesive lamination.

Samples of the adhesive coated film-foam-film composites were die cut 0.5 in×0.5 in (1.27 cm×1.27 cm) for shear testing, or ⅝ in×2 in (1.59 cm×5.08 cm) for package weight claim testing.

Silicone Polyoxamide Copolymers & Adhesive Compositions

Example 1

Preparation and Characterization of Silicone Polyoxamide Elastomer Using 15 k PDMS Diamine A 3 gal jacketed stainless steel reactor equipped with mechanical stirrer, argon inlet, thermocouple and dip tube was charged with EtOAc (5137 g) and BTFEO (65.48 g). The reactor was placed under positive Ar pressure through large oil bubbler and stirred at room temperature. While stirring a 15 k PDMS diamine was charged (AEW=7540 g/mol, 2199.66 g, 291.75 mmol of $—NH_2$). The reactor was sealed and stirred at room temperature for 1 h, at which time full consumption of BTFEO was confirmed by gas chromatography. The jacket temperature was then increased to 70° C. for 30 min, then AcOH (0.257 g) and EDA (6.4986 g) were added. Reactor was sealed under Ar atmosphere and held at a jacket temperature of 70° C. for 3 days at which time significant increase in viscosity of the reaction mixture was observed. A sample of the resulting polymer was determined to have an IV of 1.05 dL/g (0.2 g/dL in EtOAc, 27° C.).

Example 2

Preparation and Characterization of Silicone Polyoxamide Elastomer Using 13 k PDMS Diamine:

A 3 gal jacketed stainless steel reactor equipped with mechanical stirrer, argon inlet, thermocouple and dip tube was charged with EtOAc (5135.12 g) and BTFEO (71.01 g). The reactor was placed under positive Ar pressure through large oil bubbler and stirred at room temperature. While stirring a 13 k PDMS diamine was charged (AEW=6564 g/mol, 2200.30 g, 335.19 mmol of $—NH_2$). The reactor was sealed and stirred at room temperature for 1 h, at which time full consumption of BTFEO was confirmed by gas chromatography. The jacket temperature was then increased to 70° C. for 30 min, then AcOH (0.2450 g) and EDA (6.5451 g) were added. Reactor was sealed under Ar atmosphere and held at a jacket temperature of 70° C. for 3 days at which time significant increase in viscosity of the reaction mixture was observed. A sample of the resulting polymer was determined to have an IV of 0.97 dL/g (0.2 g/dL in EtOAc, 27° C.).

Examples 3-14

Capping of Silicone Polyoxamide Elastomer in EtOAc Solution

A 32 oz bottle with metal cap was charged with silicone polyoxamide elastomer (476.48 g) prepared according to Example 1 or 2. To this bottle was added capping amine as a solution in EtOAc or toluene such that final amine/ester mol ratio was equal to or greater than 1.02. Silicone polyoxamide elastomers were prepared with different capping amines according to Table 1. The bottle was sealed and placed in a Launder-O-Meter (available from Atlas Electric Devices Co., Chicago, IL) at 70° C. for 6 h, at which time the contents were cooled to ambient temperature. Reactions afforded clear, colorless elastomer solutions. Full consumption of residual trifluoroethyl oxalate ester was confirmed by qualitative $^{19}F$ NMR obtained in $CDCl_3$.

Pressure Sensitive Adhesive Preparation: Formulations from Silicone Polyoxamides Silicone polyoxamide elastomers were prepared and isolated according to Examples 1 or 2, capped according to above capping procedure and prepared as outlined in Table 1. The silicone polyoxamide elastomer was combined with MQ resin (Momentive SR-545, 63% in toluene) such that the elastomer/MQ ratio was 50/50 (w/w dry solids) and diluted such that the overall solids content was 35% and the solvent blend was a 76:24 by weight ratio of EtOAc/IPA. For comparison, Comparative Example C1 was prepared without capping amines (ester end group). Shear, Package Weight Claim, Liner Release and Peel Adhesion data were obtained according to the test methods described above. The data is summarized in Tables 2-8.

TABLE 1

| PSA Compositions | | | | | | |
|---|---|---|---|---|---|---|
| PSA Example | Elastomer Example (PDMS Diamine MW (nominal) (g/mol)) | Capping amine (solvent) | final amine/ester ratio after capping (mol/mol) | IV in EtOac (after capping) | wt % MQ (w/w dry solids) | % solids of final PSA solution |
| 3 | 1(15k) | allyl (EtOAc) | 1.02 | 1.04 | 50% | 35% |
| 4 | 2(13k) | butyl (toluene) | 1.08 | 1.00 | 50% | 35% |
| 5 | 1(15k) | Me2-eth (EtOAc) | 1.02 | 1.04 | 50% | 35% |
| 6 | 1(15k) | Me2-prop (EtOAc) | 1.02 | 1.04 | 50% | 35% |
| 7 | 2(13k) | Me-eth (toluene) | 1.07 | 1.03 | 50% | 35% |
| 8 | 2(13k) | Me-prop (toluene) | 1.07 | 1.01 | 50% | 35% |
| 9 | 2(13k) | morph (toluene) | 1.07 | 1.00 | 50% | 35% |
| 10 | 1(15k) | Ac-eth (EtOAc) | 1.02 | 1.04 | 50% | 35% |
| 11 | 1(15k) | benzyl (EtOAc) | 1.02 | 1.04 | 50% | 35% |
| 12 | 1(15k) | Boc-eth (EtOAc) | 1.02 | 1.04 | 50% | 35% |
| 13 | 2(13k) | EDA (toluene) | 1.07 | 1.09 | 50% | 35% |
| 14 | 1 (15k) | 3-aminomethylpyr (EtOAc) | 1.02 | 1.04 | 50% | 35% |
| Comparative Example C1 | 2(13k) | none (EtOAc) | 0.97 | 1.06 | 50% | 35% |

TABLE 2

| Shear (FEN on drywall, CTH) | | | | |
|---|---|---|---|---|
| Example | EG | Initial | 4 wk, 120° F. | 8 wk, 120° F. |
| 3 | allyl | >83 Days* | n.d. | n.d. |
| 4 | butyl | >28 Days | >22 Days | >21 Days |
| 5 | Me2-eth | >83 Days* | n.d. | n.d. |
| 6 | Me2-prop | >22 Days | >22 Days | n.d. |
| 7 | Me-eth | >20 Days | >22 Days | >15 Days |
| 8 | Me-prop | >28 Days | >22 Days | >21 Days |
| 9 | morph | >28 Days | >22 Days | >21 Days |
| 10 | Ac-eth | >22 Days | >22 Days | n.d. |
| 11 | benzyl | >80 Days* | n.d. | n.d. |
| 12 | Boc-eth | >80 Days* | n.d. | n.d. |
| 13 | EDA | >28 Days | >22 Days | >21 Days |
| 14 | NH2CH2pyr | >80 Days* | n.d. | n.d. |
| Comparative Example C1 | ester | >28 Days | >21 Days | >21 Days |

*In a random selection, some samples were left up hanging longer to watch and monitor their performance

TABLE 3

| Shear (glass, CIH) | | | | |
|---|---|---|---|---|
| Example | EG | Initial | 4 wk, 120° F. | 8 wk, 120° F. |
| 3 | Allyl | >21 Days | n.d. | n.d. |
| 4 | Butyl | >24 Days | >22 Days | >19 Days |
| 5 | Me2-eth | >25 Days | n.d. | n.d. |
| 6 | Me2-prop | >24 Days | >22 Days | n.d. |
| 7 | Me-eth | >24 Days | >22 Days | >19 Days |
| 8 | Me-prop | >24 Days | >22 Days | >19 Days |
| 9 | Morph | >24 Days | >22 Days | >19 Days |
| 10 | Ac-eth | >24 Days | >22 Days | n.d. |
| 11 | Benzyl | >21 Days | n.d. | n.d. |
| 12 | Boe-eth | >21 Days | n.d. | n.d. |
| 13 | EDA | >24 Days | >22 Days | >19 Days |
| 14 | NH2CH2pyr | >21 Days | n.d. | n.d. |
| Comparative Example C1 | Ester | 0.6 Days | 7 Days | >19 Days |

TABLE 4

| Shear (glass, 90° F./90RH %) | | | | | |
|---|---|---|---|---|---|
| Example | EG | Initial | 4 wk, 120° F. | 6 wk, 120° F. | 8 wk, 120° F. |
| 3 | allyl | n.d. | n.d. | n.d. | n.d. |
| 4 | butyl | >29 Days | >19 Days | n.d. | >19 Days |
| 5 | Me2-eth | n.d. | n.d. | n.d. | n.d. |
| 6 | Me2-prop | 15 Days | >19 Days | n.d. | >19 Days |
| 7 | Me-eth | >29 Days | >19 Days | n.d. | >19 Days |
| 8 | Me-prop | >29 Days | >19 Days | n.d. | >19 Days |
| 9 | Morph | >29 Days | >19 Days | n.d. | >19 Days |
| 10 | Ac-eth | >18 Days | 14 Days | n.d. | >19 Days |
| 11 | Benzyl | 18.6 Days | n.d. | >21 Days | n.d. |
| 12 | Boc-eth | >21 Days | n.d. | >21 Days | n.d. |
| 13 | EDA | >29 Days | >19 Days | n.d. | >19 Days |
| 14 | NH2CH2pyr | n.d. | n.d. | n.d. | n.d. |
| Comparative Example C1 | Ester | 1 Day | 13 Days | n.d. | 9.6 Days |

TABLE 5

| Package Weight Claim (BO on drywall, 72° F./75% RH) *In a random selection, some samples were left up hanging longer to watch and monitor their performance | | | | | | |
|---|---|---|---|---|---|---|
| Example | EG | Initial | 2wk, 120° F. | 4 wk, 120° F. | 6 wk, 120° F. | 8 wk, 120° F. |
| 3 | Allyl | >5 days | | n.d. | n.d. | n.d. |
| 4 | Butyl | >32 Days | n.d. | >32 Days | n.d. | >32 Days |
| 5 | Me2-eth | >5 days | | n.d. | | n.d. |
| 6 | Me2-prop | >32 Days | n.d. | >32 Days | n.d. | >32 Days |
| 7 | Me-eth | >32 Days | n.d. | >32 Days | n.d. | 30 Days |
| 8 | Me-prop | >32 Days | n.d. | >32 Days | n.d. | 30 Days |
| 9 | Morph | >32 Days | n.d. | >32 Days | n.d. | >32 Days |
| 10 | Ac-eth | >32 Days | n.d. | >32 Days | n.d. | >32 Days |
| 11 | Benzyl | >49 Days* | >32 Days | n.d. | >32 Days | n.d. |
| 12 | Boc-eth | >49 Days* | >49 Days* | n.d. | >32 Days | n.d. |
| 13 | EDA | >32 Days | n.d. | >32 Days | n.d. | >32 Days |
| 14 | NH2CH2pyr | >5 days | | n.d. | n.d. | n.d. |
| Comparative Example C1 | Ester | >32 Days | n.d. | >32 Days | n.d. | >32 Days |

TABLE 6

| Package Weight Claim (shower spray chamber) | | | | | |
|---|---|---|---|---|---|
| Example | EG | Initial | 2 wk, . 120° F | 4 wk, 120° F. | 6 wk, 120° F. |
| 3 | Allyl | n.d. | n.d. | n.d. | n.d. |
| 4 | Butyl | 16 | n.d. | >31 Days | n.d. |
| 5 | Me2-eth | n.d. | n.d. | n.d. | n.d. |
| 6 | Me2-prop | >31 Days | n.d. | >31 Days | n.d. |
| 7 | Me-eth | 24 | n.d. | >31 Days | n.d. |
| 8 | Me-prop | >31 Days | n.d. | >31 Days | n.d. |
| 9 | Morph | 7 Days | n.d. | 22.6 Days | n.d. |
| 10 | Ac-eth | >31 Days | n.d. | >31 Days | n.d. |
| 11 | Benzyl | >32 Days | >32 Days | n.d. | n.d. |
| 12 | Boc-eth | >32 Days | >32 Days | n.d. | n.d. |
| 13 | EDA | >31 Days | n.d. | >31 Days | n.d. |
| 14 | NH2CH2pyr | n.d. | n.d. | n.d. | n.d. |
| Comparative Example C1 | Ester | 4 Days | n.d. | 14 Days | n.d. |

TABLE 7

| Liner Release | | | | | |
|---|---|---|---|---|---|
| Example | EG | 2 wk, 120° F. | 4 wk, 120° F. | 6 wk, 120° F. | 8 wk, 120° F. |
| 3 | allyl | 24 | n.d. | 29 | n.d. |
| 4 | butyl | n.d. | 49 | n.d. | 85 |

TABLE 7-continued

| Liner Release | | | | | |
|---|---|---|---|---|---|
| Example | EG | 2 wk, 120° F. | 4 wk, 120° F. | 6 wk, 120° F. | 8 wk, 120° F. |
| 5 | Me2-eth | 70 | n.d. | 100 | n.d. |
| 6 | Me2-prop | n.d. | 126 | n.d. | 168 |
| 7 | Me-eth | n.d. | 783 | n.d. | 829 |
| 8 | Me-prop | n.d. | 712 | n.d. | 904 |
| 9 | morph | n.d. | 112 | n.d. | 152 |
| 10 | Ac-eth | n.d. | 70 | n.d. | 114 |
| 11 | benzyl | 32 | n.d. | 41 | n.d. |
| 12 | Boc-eth | 31 | n.d. | 47 | n.d. |
| 13 | EDA | n.d. | 270 | n.d. | 259 |
| 14 | NH2CH2pyr | 49 | n.d. | 66 | n.d. |
| C1 | ester | n.d. | n.d. | n.d. | 24 |

TABLE 8

| Peel Adhesion—liner side (glass, CTH) | | | | |
|---|---|---|---|---|
| Example | EG | Initial (1 hr dwell) | 4 wk, 120° F. | 8 wk, 120° F. |
| 3 | allyl | 60* | n.d. | n.d. |
| 4 | butyl | 31 | 34 | 33 |
| 5 | Me2-eth | 60* | n.d. | n.d. |
| 6 | Me2-prop | 47 | 44 | 30 |
| 7 | Me-eth | 38 | 32 | 22 |
| 8 | Me-prop | 44 | 24 | 22 |
| 9 | morph | 41 | 30 | 29 |
| 10 | Ac-eth | 54 | 39 | 36 |
| 11 | benzyl | 62* | n.d. | n.d. |
| 1211 | Boc-eth | 62* | n.d. | n.d. |
| 13 | EDA | 48 | 33 | 27 |
| 14 | NH2CH2pyr | 62* | n.d. | n.d. |
| Comparative Example C1 | ester | 26 | 34 | |

*The dwell time for these samples was 24 hrs

The complete disclosures of the publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

The invention claimed is:

1. A method of making a copolymeric material comprising at least two repeat units of formula I':

(I')

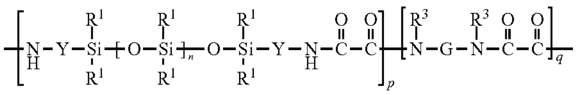

wherein:

each $R^1$ is independently an alkyl, haloalkyl, aralkyl, alkenyl, aryl, or aryl substituted with an alkyl, alkoxy, or halo;

each Y is independently an alkylene, aralkylene, or a combination thereof;

each G is a bond or alkyl (CH2)n, alkyl-aryl (CH2-Ar—CH2), aryl, heteroaryl, heterocycle, or carbocycle;

each $R^3$ is independently hydrogen or alkyl;

each n is independently an integer of 0 to 300;

each p is independently an integer of 1 to 25; and each q is independently an integer of 1 to 2, and the average of q is no greater than 1.05 the method comprising:

(a) adding an oxalate ester of formula II to a solvent (II)

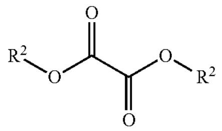

wherein:

each $R^2$ is independently an alkyl, haloalkyl, aryl, or aryl substituted with an alkyl, alkoxy, halo, alkyoxycarbonyl, or

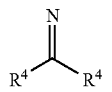

bound through the N, wherein each $R^4$ is independently hydrogen, alkyl, or aryl or $R^4$ taken together form a ring;

(b) reacting the oxalate ester with a polydiorganosiloxane diamine of formula III until essentially no polydiorganosiloxane diamine or oxalate ester remains (III)

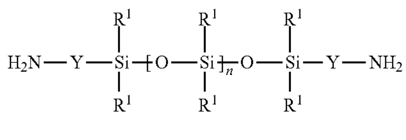

to form the reaction product of formula IV (IV)

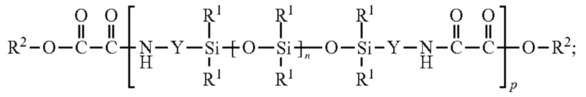

(c) adding one or more diamines of formula V to the reaction product of formula IV to form the repeat unit of formula I'

(V)

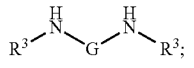

and (d) adding one or more amine-based capping agents of formula VI to halt polymerization and modify end groups of formula I'

(VI)

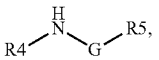

wherein $R^4$ is hydrogen or methyl, haloalkyl, aralkyl, alkenyl, aryl, or aryl substituted with an alkyl, alkoxy, or halo; and $R^5$ is hydrogen (as part of alkyl chain or aryl group), aryl, heteroaryl, amide, carbamate, or urea.

2. The method of claim 1, wherein amine-based capping agents of formula VI include propylamine, n-butylamine, tert-butylamine, aniline, 2-(aminomethyl)pyridine, 4-aminopyridine, benzylamine, N-acetylethylenediamine, and tert-Butyl N-(2-aminoethyl)carbamate, mixtures, and combinations thereof.

3. The method of claim 2, wherein the amine based capping agent is N-acetylethylenediamine, and tert-Butyl N-(2-aminoethyl) carbamate, mixtures, and combinations thereof.

4. The method of claim 1, wherein the oxalate ester of formula II is selected from the group consisting of oxalate esters of phenol, methyl ethyl ketone oxime, acetone oxime, and trifluoroethanol.

5. The method of claim 1, wherein the solvent is selected from the group consisting of tetrahydrofuran, methyl tert-butyl ether, toluene, ethyl acetate, dichloromethane, and chloroform.

6. The method of claim 1, wherein the polydiorganosiloxane diamine of formula III has a number average molecular weight of about 1000 g/mol to about 20,000 g/mol.

7. The method of claim 4, wherein the polydiorganosiloxane diamine of formula III has a number average molecular weight of about 10,000 g/mol to about 17,000 g/mol.

8. The method of claim 1, wherein the molar ratio of oxalate ester of formula II to polydiorganosiloxane diamine of formula III is at least 1:0.56.

9. The method of claim 1, wherein the oxalate ester of formula II is fully consumed upon reacting with the polydiorganosiloxane diamine of formula III.

10. The method of claim 1, wherein the method is performed in the presence of a protic acid catalyst.

11. The method of claim 10, wherein the catalyst comprises acetic acid, and where the catalyst is added during at least one of step (c) and step (d).

12. The method of claim 10, wherein the copolymer of formula I' includes at least than 95 weight percent polydiorganosiloxane segments p based on the weight of the copolymer.

13. The method of claim 1, wherein the diamine of formula V is selected from the group consisting of 1,2-diaminoethane, 1,3-diaminopropane, 1,4-diaminobutane, 1,5-diaminopentane, 2-methyl-1,5-pentanediamine, 1,6-diaminohexane, and m-xylylenediamine.

14. The method of claim 1, wherein the molar ratio of polydiorganosiloxane diamine of formula III to the sum of the diamine of formula V and the capping agent of formula IV is less than or equal to about 1:0.8.

15. The method of claim 1, wherein the molar ratio of the polydiorganosiloxane diamine of formula III to the sum of the diamine of formula V and the capping agent of formula IV to the oxalate ester of formula II is about 0.55:0.45:1.

16. The method of claim 1 wherein each $R^1$ is methyl.

17. The method of claim 1 wherein each Y is an alkylene having 1 to 10 carbon atoms, phenylene bonded to an alkylene having 1 to 10 carbon atoms, or phenylene bonded to a first alkylene having 1 to 10 carbon atoms and to a second alkylene having 1 to 10 carbon atoms.

18. The method of claim 1 wherein G is an alkylene, heteroalkylene, arylene, aralkylene, or a combination thereof.

19. The method of claim 1 wherein each $R^3$ is hydrogen.

20. An article comprising the copolymer of formula I' formed using the method of claim 1, wherein the article is a pressure sensitive adhesive, film, mixture, or low adhesion backsize.

21. An adhesive composition, comprising the copolymer of formula I' formed using the method of claim 1, a silicate tackifying resin, and optionally inorganic particle filler.

22. The adhesive composition of claim 21, wherein the adhesive composition demonstrates a shear strength of greater than 10,000 minutes as measured according to CTH modified ASTM D3654-82.

* * * * *